Dec. 21, 1926.  1,611,685
W. M. SHEEHAN
TRAILER TRUCK
Filed August 12, 1925
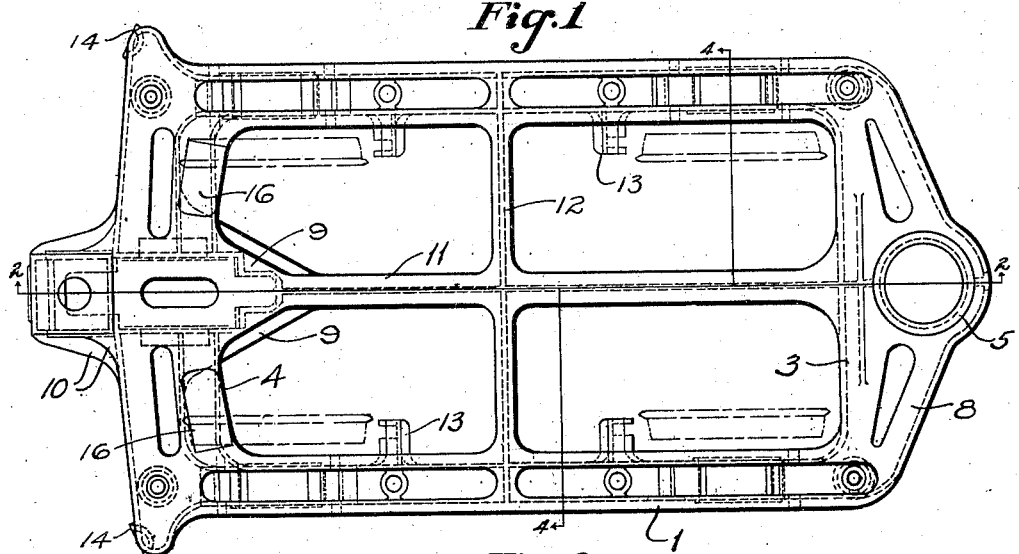
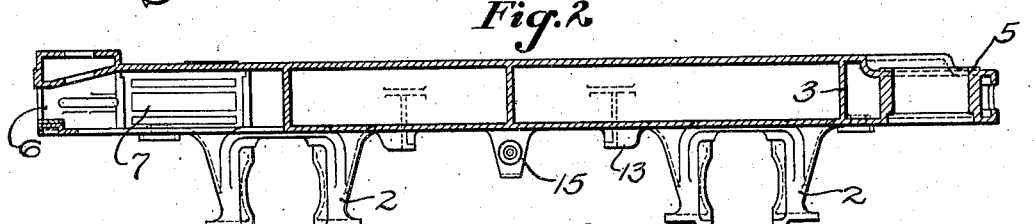
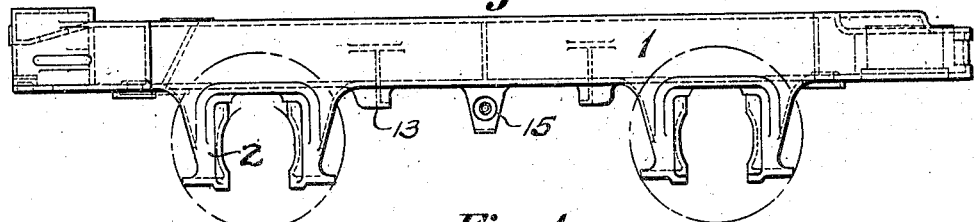
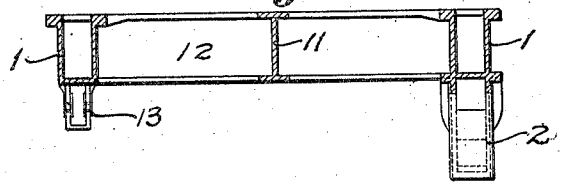
Inventor
William M. Sheehan
By Cornwall, Bedell & James
Att'ys.

Patented Dec. 21, 1926.

1,611,685

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER TRUCK.

Application filed August 12, 1925. Serial No. 49,734.

My invention relates to railway rolling stock and consists in an improved trailer truck for locomotives.

My invention is particularly adapted for use in a trailer truck forming a part of an electric locomotive in which there is no ash pan or other apparatus projecting in between the sides of the truck and below the top thereof.

The objects of my invention are to provide a more rigid truck frame structure without unduly increasing the weight of the truck and, if possible, to lighten the truck frame by a better arrangement of the frame elements. I accomplish this object by providing a continuous draft member in a straight line between the points of attachment of draft devices to the truck frame. Preferably, this draft member extends through the longitudinal center of the frame and is braced intermediate its ends by a transverse member extending to the sides of the frame. While not essential to the embodiment of my invention, I prefer to make the truck frame a single casting and to form integrally therewith the pedestals, drawbar pockets, buffing plates, pivot bearings, and brake hanger brackets.

In the accompanying drawings which illustrate a selected embodiment of my invention,—

Figure 1 is a top view of a one-piece casting embodying my invention with the truck wheels shown in broken lines to indicate their positions relative to the frame when the truck is completed.

Figure 2 is a longitudinal vertical view on line 2—2 of Figure 1.

Figure 3 is a side elevation of the truck frame.

Figure 4 is a transverse vertical section on line 4—4 of Figure 1.

The frame includes wheel pieces 1, which are preferably U-shaped in cross section and have pedestals 2 formed integrally therewith. The ends of the wheel pieces 1 are connected to each other by transoms or end members 3 and 4, the end member 3 having integrally formed therewith a circular bearing 5 for providing a radial connection to the main frame of the locomotive or to another articular unit. The rear transom 4 has formed integrally therewith the drawbar pocket 6 and the draft gear housing 7. While the frame is roughly rectangular in outline, the connections of the parts just mentioned include such diagonal or inclined ribs or other reinforcements as are indicated at 8, 9, and 10, respectively.

Extending between transoms 3 and 4 is a centrally located continuous member 11 which is I-shaped in cross section, the top flanges of member 11 being preferably level with the top flanges of the wheel pieces 1 and with corresponding flanges formed on the ends of the frame. By means of member 11 any pulling or buffing stress is transmitted directly from the front to the rear of the truck frame and hence from the locomotive frame to the underframe of the car or other vehicle to which the locomotive is connected. Obviously, the provision of a straight member between the two draft connections makes it unnecessary to so stiffen the transverse members and the wheel pieces to such an extent that they in themselves will be strong enough to take care of the draft and buffing stresses. If desired, a transverse brace 12 may be provided for member 11 intermediate the ends of the latter and connecting the wheel pieces with the draft member. This brace is also I-shaped in cross section. Preferably, the wheel pieces include integral brake hanger brackets 13, push pull pockets 14, equalizer fulcrums 15, and side bearing pads 16 for the rear end of the locomotive main frame or cradle.

While the above described structure is the preferred embodiment of my invention, I contemplate the exclusive use of such modifications in the arrangement of the parts and other details as may be suggested in the commercial development of my invention as are included in my claims.

I claim:

1. In a trailer truck, wheel pieces, transoms connecting the ends of said wheel pieces with recesses for receiving draft devices positioned in each transom and a central longitudinal member connecting the inner walls of said recesses.

2. In a trailer truck, wheel pieces, transoms connecting the ends of said wheel pieces with recesses for receiving draft devices positioned in each transom and a central longitudinal member connecting the inner walls of said recesses, all formed integrally.

3. A trailer truck comprising wheel pieces, end pieces, a forwardly located bearing for a radial connection to a locomotive main frame, a rearwardly located drawbar pocket, and a centrally located longitudinal draft member connecting said bearing and pocket and located in substantially the same horizontal plane as said bearing and pocket.

4. A trailer truck comprising wheel pieces, end pieces, a forwardly located bearing for a radial connection to a locomotive main frame and a rearwardly located drawbar pocket, a centrally located longitudinal draft member connecting said bearing and pocket, and transverse stiffeners for said member, all of said parts being located in substantially the same horizontal plane.

5. A trailer truck comprising wheel pieces, end pieces, a centrally located draft member connecting said end pieces, and transverse stiffeners for said draft member, all of said parts being located in substantially the same horizontal plane.

6. A trailer truck frame formed of a one-piece casting and including wheel pieces, pedestals, radial connection bearing, drawbar pocket, and a single draft sill connecting said bearing and pocket.

7. A trailer truck frame formed of a one-piece casting and including wheel pieces, pedestals, radial connection bearing, drawbar pocket, a single draft sill connecting said bearing and pocket, and a transverse element between said sill and said wheel pieces intermediate said pedestals.

8. A one-piece casting comprising a truck frame having U-shaped wheel pieces, and a longitudinal I-shaped member located between said wheel pieces and adapted to transmit buffing and pulling stresses between the ends of said frame.

In testimony whereof I hereunto affix my signature this sixth day of August, 1925.

WILLIAM M. SHEEHAN.